(12) United States Patent
Jasmin

(10) Patent No.: US 11,979,108 B2
(45) Date of Patent: *May 7, 2024

(54) DEVICE AND SYSTEM FOR MOUNTING SOLAR PANELS TO METAL ROOFS

(71) Applicant: Sunmodo Corporation, Vancouver, WA (US)

(72) Inventor: Roland Jasmin, Vancouver, WA (US)

(73) Assignee: Sunmodo Corporation, Vancouver, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/500,349

(22) Filed: Nov. 2, 2023

(65) Prior Publication Data

US 2024/0072719 A1 Feb. 29, 2024

Related U.S. Application Data

(63) Continuation of application No. 17/822,784, filed on Aug. 27, 2022, now Pat. No. 11,848,638.

(51) Int. Cl.
 *H02S 20/23* (2014.01)
(52) U.S. Cl.
 CPC .................................. *H02S 20/23* (2014.12)
(58) Field of Classification Search
 None
 See application file for complete search history.

(56) References Cited

U.S. PATENT DOCUMENTS

| | | | |
|---|---|---|---|
| 8,282,048 | B2 | 10/2012 | Nguyen et al. |
| 8,882,072 | B2 | 11/2014 | Hattori et al. |
| 9,479,109 | B2 | 10/2016 | Schmid et al. |
| 10,840,851 | B2 | 11/2020 | Schaefer |

(Continued)

FOREIGN PATENT DOCUMENTS

| | | | |
|---|---|---|---|
| DE | 202010001238 U1 | 5/2010 |
| DE | 202010007000 U1 | 10/2010 |

(Continued)

OTHER PUBLICATIONS

S-5! The Right Way: ProteaBracket Installation Instructions, AIPB-V1.2-0519, May 2019, Metal Roof Innovations, Ltd., Colorado Springs, Colorado.

(Continued)

*Primary Examiner* — Steven M Marsh
(74) *Attorney, Agent, or Firm* — Stone Creek Services LLC; Alan M Flum

(57) ABSTRACT

This disclosure discusses devices and systems for attaching solar panels to metal roofs. A mounting device has two or more hinge bases that can pivot at various angles about a hinge platform assembly. The hinge platform assembly is optionally widthwise adjustable. The above-mentioned adjustments allow the mounting device to secure solar panels to various types of metal roofs such as flat, corrugated, and trapezoidal. The hinge platform assembly interfaces with various components of the solar panel racking system. The hinge platform assembly includes hinge sleeves that pass into slots within the hinge bases and surround hinge pins that project upward from the hinge bases. This allows the hinge bases to captively rotate about the hinge platform assembly.

20 Claims, 14 Drawing Sheets

(56) References Cited

U.S. PATENT DOCUMENTS

| | | | |
|---|---|---|---|
| 11,125,356 | B2 | 9/2021 | Gallegos et al. |
| 11,408,555 | B2 | 8/2022 | Xie |
| 11,649,986 | B2 | 5/2023 | Powers |
| 2014/0144089 | A1 | 5/2014 | Borra |
| 2015/0316639 | A1* | 11/2015 | Russ .................. H02S 20/00 250/203.4 |
| 2016/0025262 | A1 | 1/2016 | Stearns et al. |
| 2017/0359017 | A1 | 12/2017 | Corrio |
| 2018/0091088 | A1* | 3/2018 | Barton .................. F24S 30/425 |
| 2019/0296688 | A1* | 9/2019 | Kresse .................. F24S 30/425 |
| 2020/0162016 | A1 | 5/2020 | Corio |

FOREIGN PATENT DOCUMENTS

| | | |
|---|---|---|
| DE | 202012005672 U1 | 8/2012 |
| DE | 102011119847 A1 | 6/2013 |
| DE | 202015102941 U1 | 9/2015 |
| EP | 2413064 A2 | 2/2012 |
| EP | 2230469 B1 | 5/2015 |
| GB | 2558524 A | 7/2018 |
| JP | 2007284956 A | 11/2007 |
| WO | 2013097840 A1 | 7/2013 |

OTHER PUBLICATIONS

S-5! The Right Way: ProteaBracket Installation Brochure, Version 07089, Jul. 2019, Metal Roof Innovations, Ltd., Colorado Springs, Colorado.
Powermount Adjust for R-Panel Roofs, Oct. 2019, Solar Connections International, McHenry, IL.
MageRack Roof Attachments and Mounting Kits for Metal Roofs Catalog Specification, May 2019, Magerack Corporation, Riverside, California.
Metal Roof Bracket And Clamp, MageBracket R and F for R-Panel Trapezoidal Metal Roof, MageBracket CH and CL for Corrugated Metal Roof, downloaded from the Internet from https://www.magerack.com/roof-attachments-includes-I-foot-with-flashing-tile-hook-standoff-clamp-and-bracket/mage_clamp/ on Jun. 23, 2022.
Haining Chuangyuan Solar Energy Technology Co., Ltd. Catalog, Jun. 2020, downloaded from the Internet from http://www.cysolarmounting.com/res/soft/2020/d300f72270662fc6.pdf on Jun. 23, 2022.
PV adjustable clamp for trapezoidal metal roof, solar panel mounting clamps, Haining Chuangyuan Solar Energy Technology Co., Ltd., downloaded from the Internet from https://www.alibaba.com/product-detail/PV-adjustable-clamp-for-trapezoidal-metal_60792045097.html on Jun. 26, 2022.
Galvanized Trapezoidal Metal Roofing Universal Clamp SPC-CK-29, Xiamen Top Best Tech Co., Ltd., Xiamen, China, downloaded from the Internet from https://www.solarpartscomponents.com/trapezoidal-metal-roof-solar-mounting-universal-clamps on Jun. 26, 2022.
Roof Solution Solar Multifunctional Bracket Installation Manual, Xiamen Top Best Tech Co., Ltd., Xiamen, China, downloaded from the Internet from https://www.solarpartscomponents.com/wp-content/uploads/2020/12/Installation-of-trapezoidal-tin-roof-mounting-clamp-spc-ck-02.pdf on Jun. 26, 2022.
ClampFit Product Sheet, 400402EN, Ver. 1, Sep. 2019, Schletter Solar GMBH, Kirchdorf, Germany.
MG Solar Solar PV Mounting System Solar Panel Brackets Catalog, Mar. 2020, pp. 6-8, Xiamen Megan Solar Co, Ltd., Xiamen City, China.
Adjustable Clip, Jiangyin Titanergy Co., Ltd, Jiangyin, China, downloaded from the Internet from https://www.titanergysolar.com/Product/Adjustable-Clip;CLIP;-Solar-Roof-Mounting;-PV-Panel-Mounting-Metal-Roof-System-Standing-Seam-Roof-Hook-Aluminum-Solar-Clamp.html on Jun. 26, 2022.
CorruSlide Brochure, Version 1.5, Mar. 2022, EcoFasten Solar LLC, Phoenix, Arizona.
Test Our Metal, Sunmodo Metal Roof Mount Product Family, Sep. 2019, Sunmodo Corporation, Vancouver, Washington.
Extended European Search Report for European Patent Application No. EP 23164968.2, Applicant: Sunmodo Corporation, Date of Report: Feb. 5, 2024, European Patent Office , Munich, Germany.

* cited by examiner

DEVICE AND SYSTEM FOR MOUNTING SOLAR PANELS TO METAL ROOFS

CROSS-REFERENCES

This application is a continuation of U.S. patent application Ser. No. 17/822,784, filed on Aug. 27, 2022. U.S. patent application Ser. No. 17/822,784 is hereby incorporated by reference.

FIELD OF INVENTION

The present disclosure relates to solar panel racking systems, also known as solar panel mountings systems, as well as devices for mounting solar panels to metal roofs.

BACKGROUND

Solar photovoltaic panels, or simply "solar panels" for the purposes of this disclosure, are installed on various types of residential and commercial roofs. These roofs can be found on building roof tops or can be found on shade structures such as awnings and carports. Residential and commercial roofs can be constructed from overlapping metal panels that are typically made of galvanized steel or aluminum. These panels come in a variety of profiles including flat, corrugated, or ribbed.

Flat metal roofs are predominantly flat and can be interspersed with small ribs for added strength. Corrugated metal roofs typically have a rounded or wavy cross-sectional profile.

Ribbed metal panels typically have ribs that can have sloped or straight sides and a flat top. Ribbed metal panels with straight sides and a flat top are known as box-rib because of their box-like shape. Ribbed metal panels where the ribs have sloped sides and a flat top are known as trapezoidal roof panels because of their trapezoidal shape. Often metal panel profiles can come in a combination of trapezoidal-shaped and box-shaped ribs. For example, what could be considered in the trade as a trapezoidal roof panel may actually comprise trapezoidal-shaped ribs separated by relatively flat sections of panel with box-shaped ribs added to the flat section for strength. The box-shaped ribs are narrow and low as compared with the trapezoidal ribs.

Solar panels can be attached to the above described metal roofs through racking systems that include rails and mounting devices that secure the rails to the metal roofs.

SUMMARY

The inventor set out to create a solar panel racking system that can be secured to a variety of metal roof profiles including corrugated, trapezoidal, and flat roofs. He accomplished this by developing a mounting device that is hinged, and optionally adjustable in width, so that it may accommodate a variety of metal roof types and profiles. The racking system is secured to the mounting device. The mounting device is secured to the roof surface.

The inventor simplified the hinge or pivoting mechanism of the mounting device by creating a pair of hinge bases, each with a hinge pin running lengthwise along their respective hinge base. Hollow arcuate-shaped hinge sleeves extend downward from a hinge platform assembly. The hinge sleeves at least partially surround the hinge pins and extend into slot-shaped apertures. The hinge sleeves are held captive around the hinge pins and within the hinge base by the slot-shaped apertures. The slot-shaped apertures are positioned lengthwise through the hinge bases and parallel to the hinge pins.

The hinge bases attach the mounting device to the metal roof panels using roof mounting fasteners, such as self-drilling screws. The self-drilling screws extend into a corresponding gasket positioned under each of the hinge bases. By pivoting or rotating a hinge base relative to its corresponding hinge platform, the mounting assembly can be secured to a variety of metal roof profiles, for example, corrugated metal roof profiles, trapezoidal and other ribbed roof profiles, as well as flat metal roof profiles.

The hinge platform assembly is used to mount solar racking brackets, such as an L-foot or L-foot adapters and other solar panel racking devices such as rails or rails in combination with an L-foot or L-foot adapter. The hinge platform assembly can be a single unit or can be divided into two sections to allow widthwise adjustment in order to accommodate a wider variety of metal roof profiles. For example, the hinge platform assembly can include a hinge platform with a slot-shaped aperture and a hinge sub-platform with a threaded aperture. A threaded fastener can pass into the slot-shaped aperture and threadedly engage the threaded aperture. The slot-shaped aperture allows the hinge platform to be moved widthwise relative to the hinge sub-platform.

The hinge pins can extend directly and rigidly upward from their respective hinge bases with the slot-shaped aperture positioned within the roof-anchoring platform of the hinge base. Alternatively, the hinge pin can extend from the end of a riser that extends upward from and lengthwise along the hinge base. The slot-shaped aperture could extend lengthwise through the riser.

These examples and the above-mentioned advantages are representative and are not meant to limit the inventive concept to the examples given or the discussed advantages. This summary is not exhaustive. Additional features and advantages will be apparent from the Detailed Description, drawings, and claims.

DETAILED DESCRIPTION

When describing the figures, the terms "top," "bottom," "front," "side," "left," and "right" are relative terms. Specific dimensions are intended to help the reader understand the scale of the disclosed material. Dimensions given are typical and the claims are not limited to the recited dimensions. Ordinals such as "first," "second," or "third," are used in this Detailed Description and in the claims to differentiate between similarly-named parts and do not imply a particular order, preference, or importance. "Optional" or "optionally" is used throughout this disclosure to describe features or structures that are optional. Not using the word "optional" or "optionally" to describe a feature or structure does not imply that the feature or structure is not optional. Finally, the word "or" is used in the ordinary sense to mean an "inclusive or," unless preceded by a qualifier, such as the word "either," that signals an "exclusive or."

The inventor developed a mounting device that allows solar panels to be attached to various types of metal roofs. These include metal roofs with corrugated, flat, and ribbed metal panels. This Detailed Description is divided into a System Overview, General Concepts, Examples, and Conclusion. The System Overview, which is illustrated by FIGS. 1-4, discusses the mounting device in relationship to a solar panel assembly. The General Concepts, which is illustrated in FIGS. 5-13, discuss the structure and function of the mounting device. Examples, which are illustrated in FIGS. 14-18, discuss various roof structures that the mounting device can attach to.

System Overview

Figure 1:
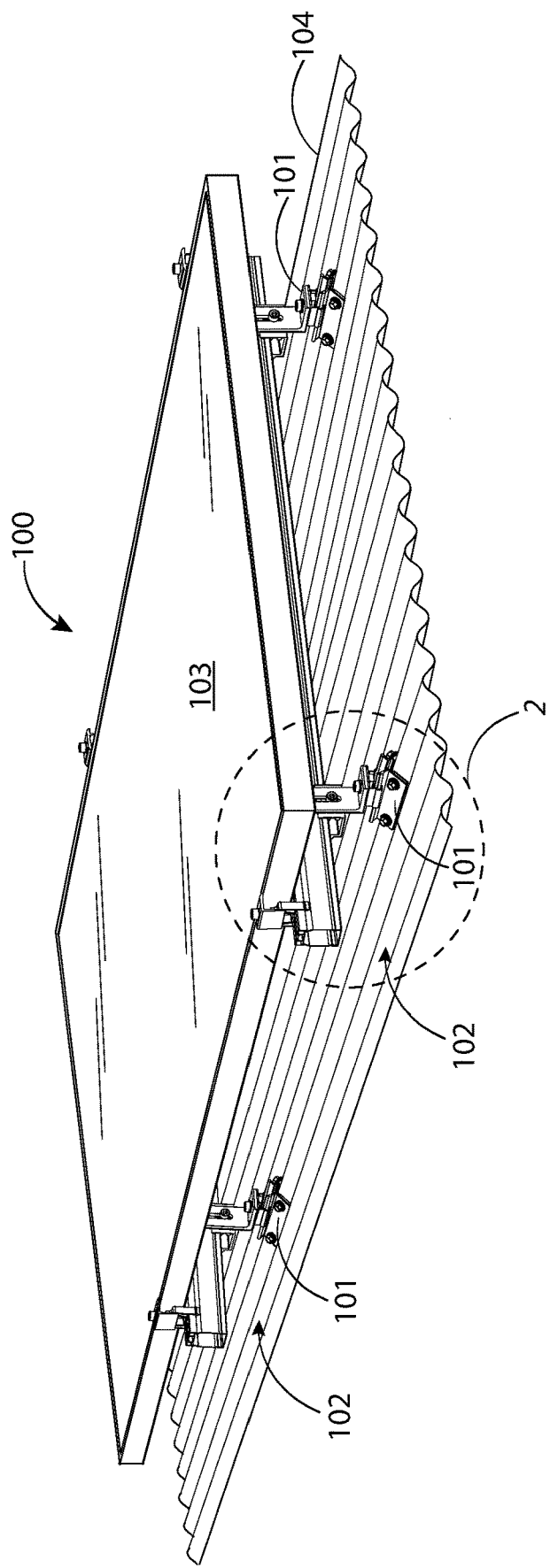
FIG. 1 illustrates, in perspective view, a portion of a solar panel, metal roof, and a solar panel racking system.

FIG. 1 illustrates a simplified version of a solar panel assembly 100 that includes several instances of the mounting device 101. The instances of the mounting device 101 are part of a solar panel racking system 102. Solar panel racking system 102 secures solar panel 103 to metal roof 104.

The solar panel assembly 100 is simplified for illustration. Residential and commercial solar panel systems typically include many more solar panels. For example, a 20-kW residential array using 480 W solar panels would require forty-two solar panels. A 1000 kW (1 MW) commercial system using 480 W solar panels would require over 2000 solar panels and could include as many as 2000 instances of the mounting device 101.

Figure 2:
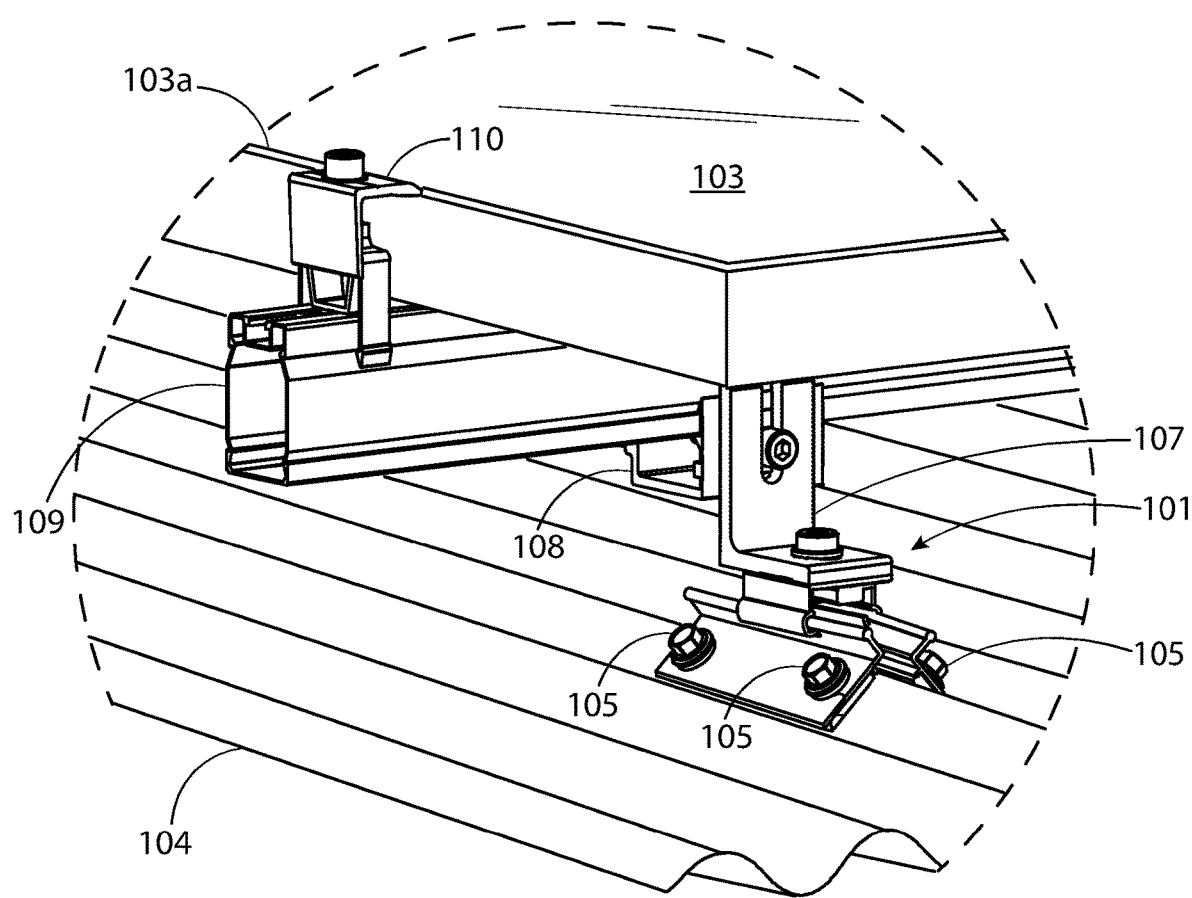
FIG. 2 illustrates a portion of FIG. 1, enlarged to magnify the mounting device, portions of an L-foot adapter, rail, solar panel clamp, and solar panel.
Figure 3:
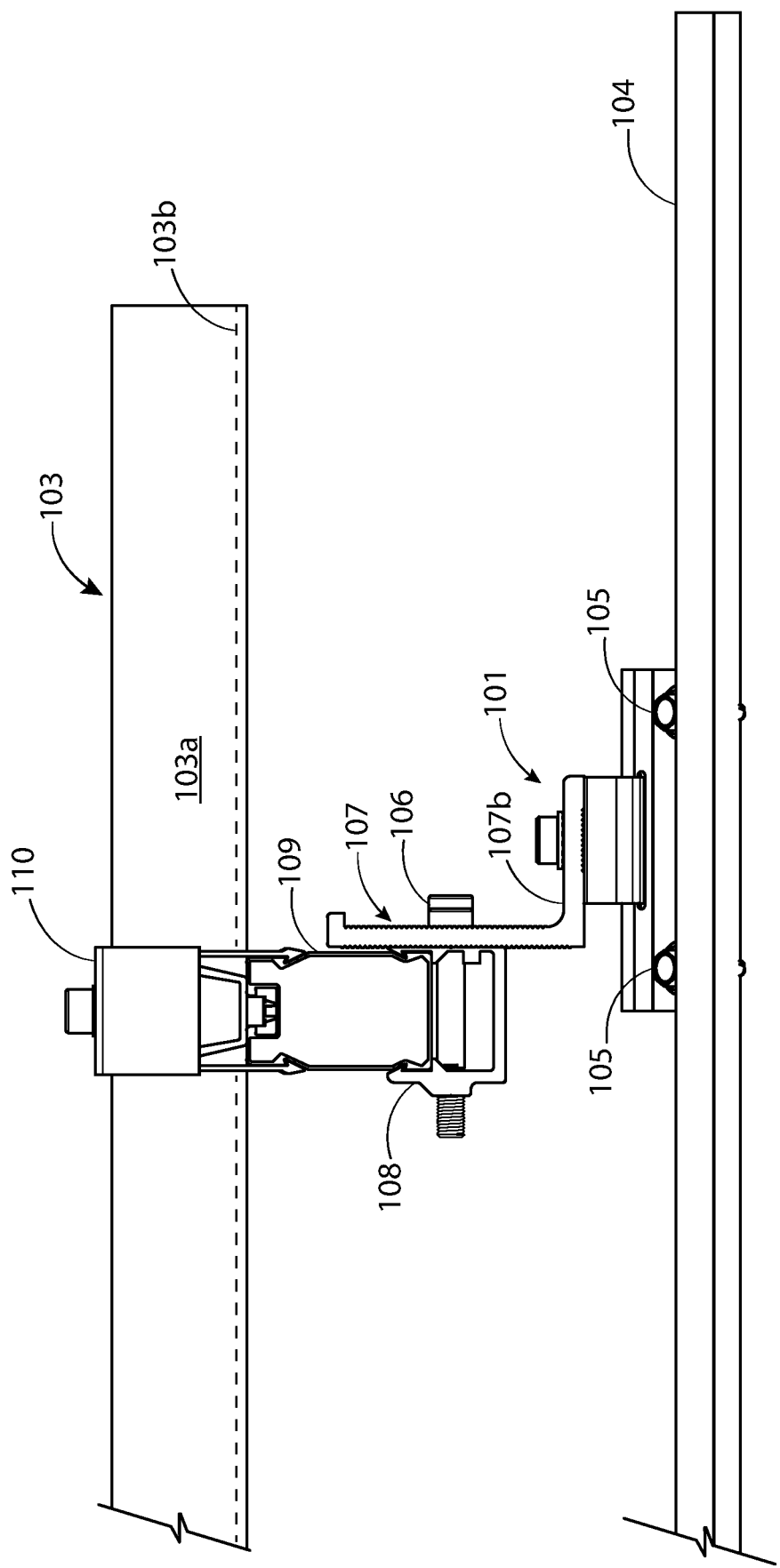
FIG. 3 illustrates, approximately the portion of FIG. 1 illustrated in FIG. 2 in left and side elevation view.
Figure 4:
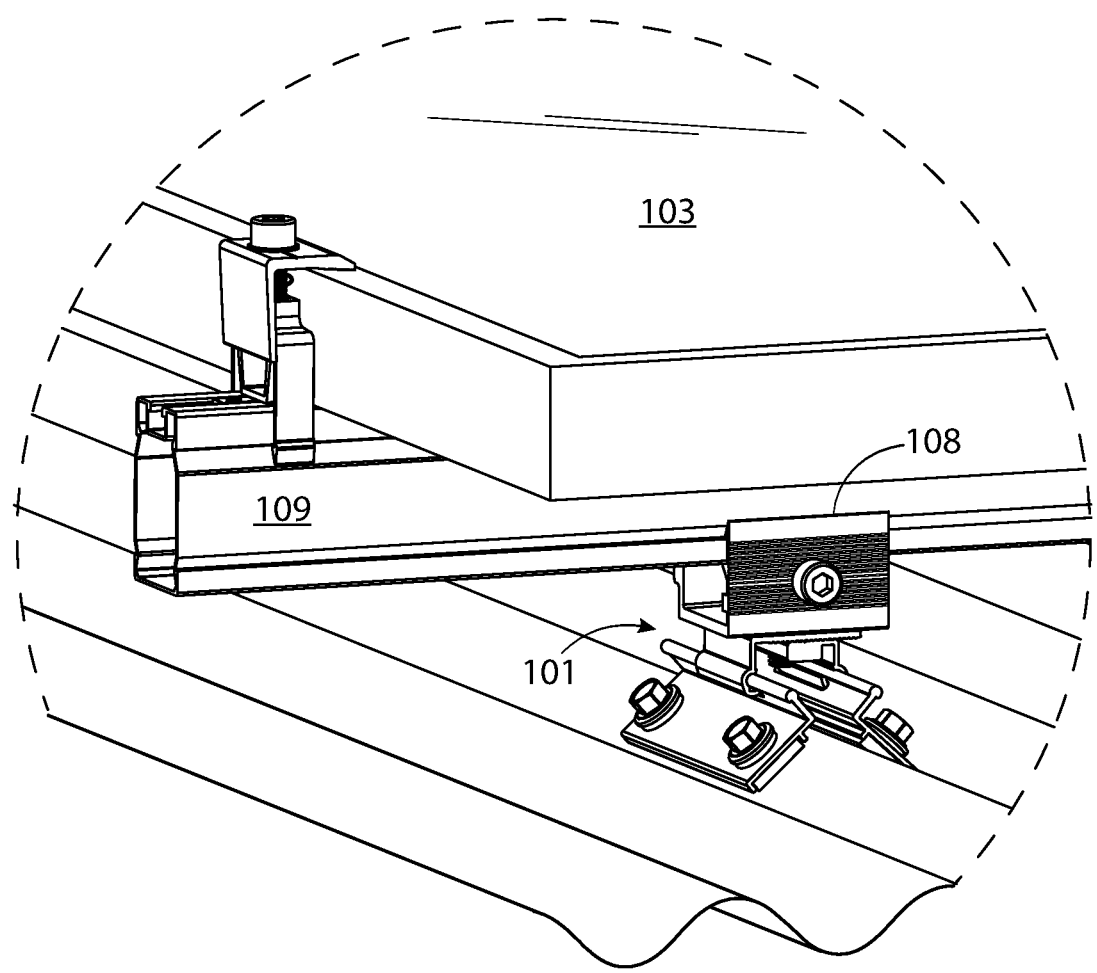
FIG. 4 illustrates an alternative version of FIG. 2, showing the mounting device without the optional L-foot.

Referring to FIGS. 2 and 3, the mounting device 101 is fastened to the metal roof 104 using several instances of a roof mounting fastener 105. The mounting device 101 can optionally include an L-foot 107. Here the L-foot 107 is fastened to the L-foot adapter 108, that clamps over a portion of the outside of a rail 109 by pressure. An over-the-panel clamp 110, in the form of an end clamp, clamps the top of the frame 103a of the solar panel 103 to the rail 109.

The mounting device 101 is not limited to the racking system 102 shown in FIG. 1. Here are a few examples. In a first example, instead of the L-foot 107 being attached to the L-foot adapter 108, and the L-foot adapter 108 attached to the rail 109 without slots on its sides, as in FIG. 3, an L-foot could be fastened directly to a rail that includes a slotted side. In a second example, in place of the over-the-panel clamp 110 of FIG. 3, an under-the-panel clamp could clamp the return flange 103b (i.e. inner frame lip) of frame 103a of the solar panel 103 to the rail 109. In a third example, referring to FIG. 4, if height adjustment of the rail 109 and solar panel 103 is not required, the L-foot adapter 108 could attach directly to the mounting device 101 without the need for the L-foot.

General Concepts

Figure 5:
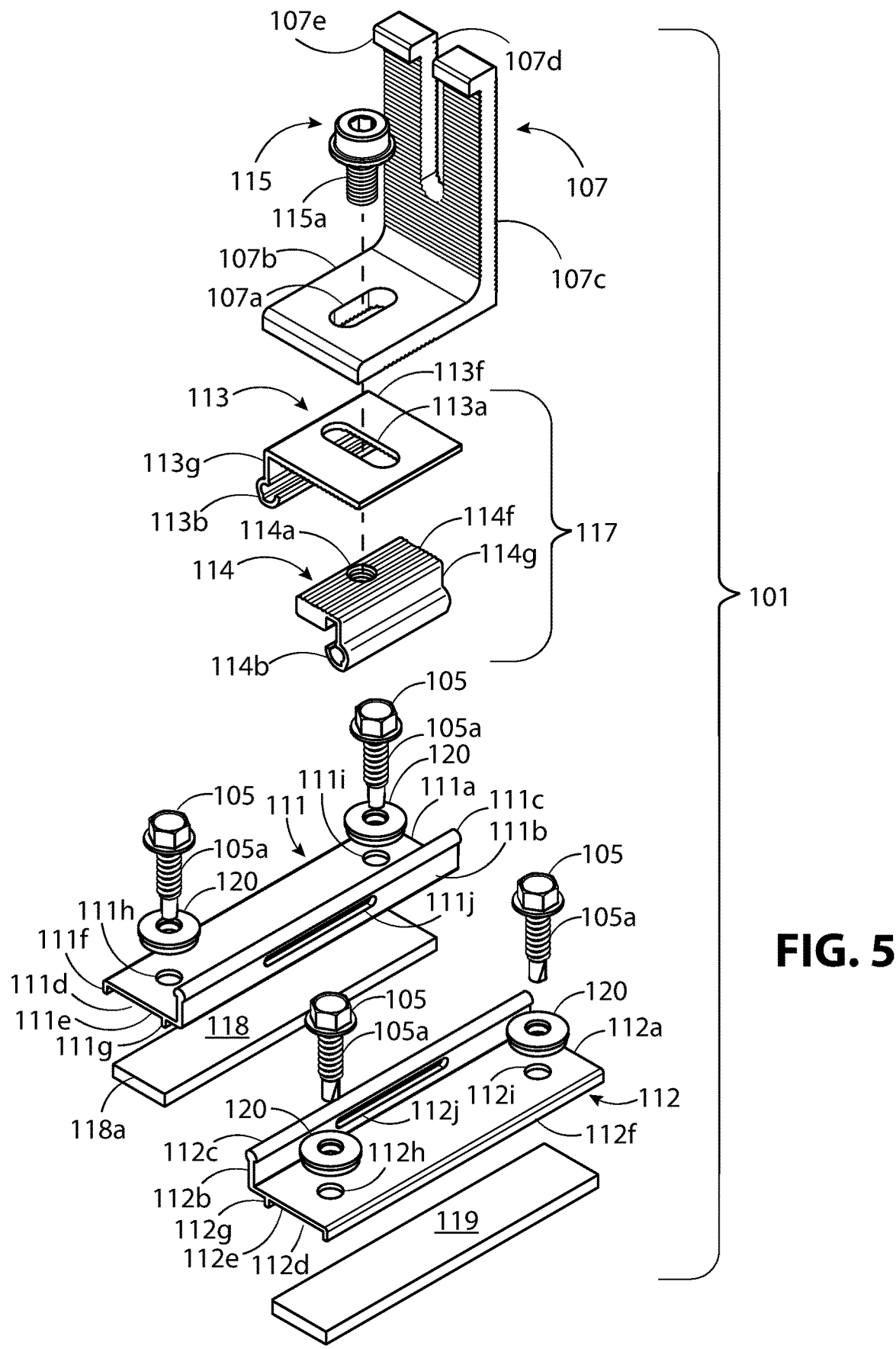
FIG. 5 illustrates, an exploded isometric view, of the mounting device from FIG. 2.
Figure 6:
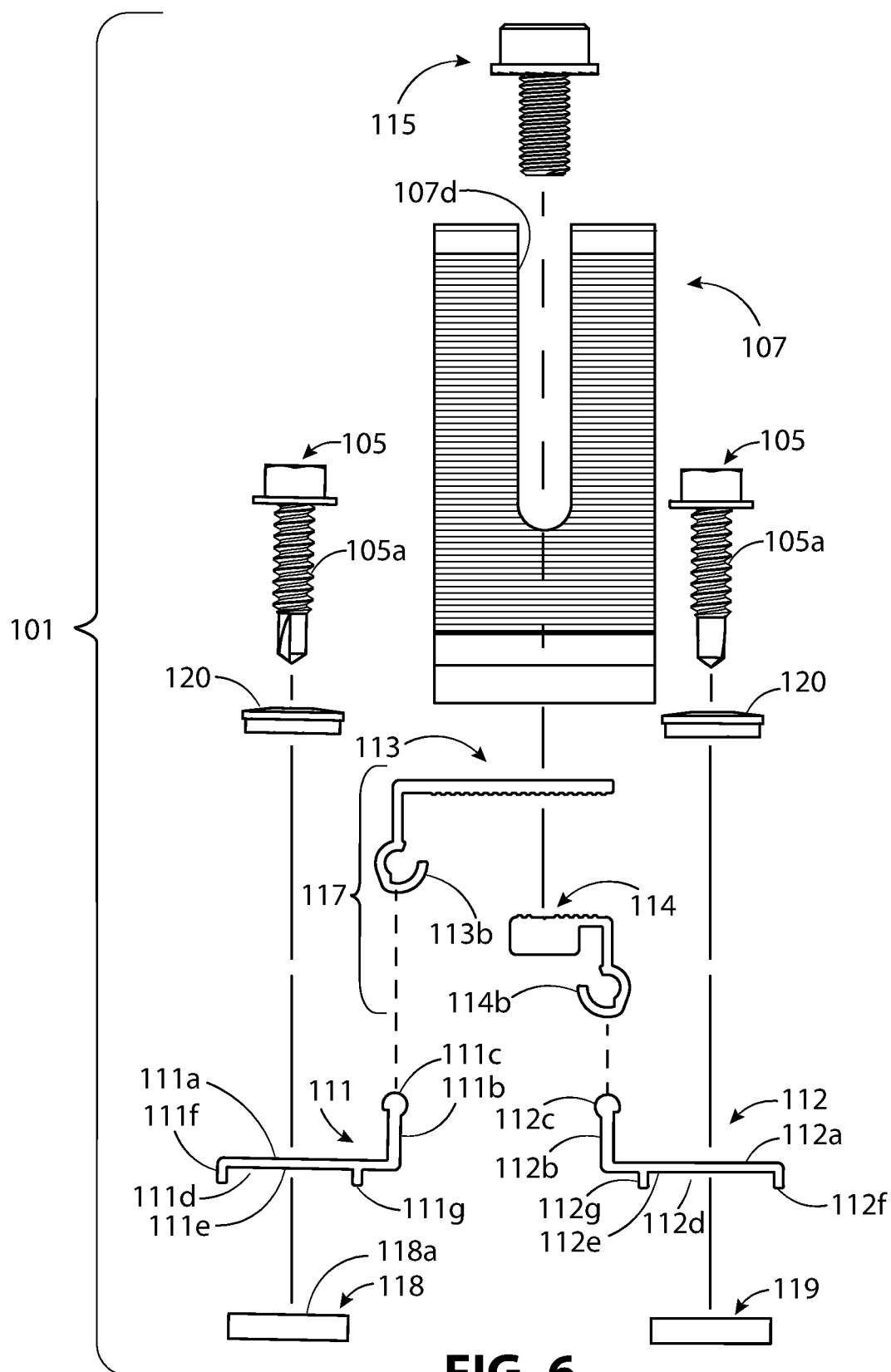
FIG. 6 illustrates, an exploded front view of the mounting device from FIG. 2.

Referring to FIGS. 5 and 6, the mounting device 101 is illustrated as including a first hinge base 111, a second hinge base 112, a hinge platform 113, a hinge sub-platform 114, and optionally, the L-foot 107. The hinge platform 113 and hinge sub-platform 114 are secured together by a threaded fastener 115 to form a hinge platform assembly 117. Referring to FIG. 5, the threaded fastener body 115a passes through slot-shaped aperture 113a in the hinge platform 113 and threadedly engages a threaded aperture 114a in hinge sub-platform 114. With the threaded fastener 115 tightened, the hinge platform 113 and the hinge sub-platform 114 form a rigid assembly. The L-foot 107 or alternatively another solar racking bracket, such as the L-foot adapter 108, as described for FIG. 4, can be attached to the hinge platform assembly 117 by the threaded fastener 115. Continuing to refer to FIG. 5, the L-foot 107 can be secured to the hinge platform assembly 117 by passing the threaded fastener body 115a through a slot-shaped aperture 107a on the L-foot base 107b, through the slot-shaped aperture 113a, and then threadedly engaging the threaded aperture 114a. The L-foot 107 also includes an L-foot riser 107c that extends upward from the L-foot base 107b. The L-foot riser 107c is illustrated with a slot-shaped opening 107d. Referring to FIG. 3, the slot-shaped opening 107d of FIG. 5 allows a fastener, such as threaded fastener 106, to engage the L-foot adapter 108, and move the rail 109 up or down relative to the L-foot base 107b. Referring to FIG. 5, the L-foot riser 107c can include a keeper 107e extending outward from the L-foot riser 107c in the direction of the L-foot base 107b to prevent a partially-tightened fastener from exiting the top of the slot-shaped opening 107d.

Referring to FIGS. 5 and 6, the first hinge base 111 includes roof-anchoring platform 111a, riser 111b extending upward from the roof-anchoring platform 111a, and hinge pin 111c extending lengthwise along the end of riser 111b. The end of riser 111b is distal to the roof-anchoring platform 111a. The hinge pin 111c is rigidly attached to the end of the riser 111b forming a rigid structure with roof-anchoring platform 111a. The second hinge base 112 includes roof-anchoring platform 112a, riser 112b extending upward from the roof-anchoring platform 112a, and hinge pin 112c extending lengthwise along the end of riser 112b. The end of riser 112b is distal to the roof-anchoring platform 112a. The hinge pin 112c is rigidly attached to the end of the riser 112b forming a rigid structure with the roof-anchoring platform 112a. The roof-anchoring platform 111a and roof-anchoring platform 112a include cavity 111d and cavity 112d, respectively. Cavity 111d extends below the roof-anchoring platform bottom surface 111e and between a first sidewall 111f and a second sidewall 111g. The first sidewall 111f and second sidewall 111g project downward from the roof-anchoring platform bottom surface 111e. Cavity 112d extends below the roof-anchoring platform bottom surface 112e and between a first sidewall 112f and a second sidewall 112g. First sidewall 112f and second sidewall 112g project downward from the roof-anchoring platform bottom surface 112e. Cavity 111d and cavity 112d receive gasket 118 and gasket 119, respectively. Gasket 118 and gasket 119 can be held in their respective cavities by pressure or can be secured by an adhesive or bonding agent. For example, gasket 118 can have a pre-applied adhesive strip that secures it to roof-anchoring platform bottom surface 111e. Alternatively, adhesive could be applied to either the roof-anchoring platform bottom surface 111e or the gasket top surface 118a.

FIGS. 5 and 6 show various instances of roof mounting fasteners, roof mounting fastener 105 with threaded fastener bodies 105a. Referring to FIG. 5 the threaded fastener bodies 105a pass through a corresponding instance of a sealing washer 120, then into corresponding apertures, aperture 111h, aperture 111i, aperture 112h, and aperture 112i, and finally into corresponding gaskets, gasket 118, and gasket 119. The sealing washer 120 is also illustrated in FIG. 6. Roof mounting fastener 105 is typically a self-taping or self-drilling screw. The sealing washer is typically a conical metal washer with a gasket such as polychloroprene (neoprene) or ethylene propylene diene monomer rubber (EPDM).

Referring to FIGS. 5, 6, 7, and 9, the first hinge base 111 and the second hinge base 112 pivotally engage the hinge platform assembly 117. First hinge sleeve 113b wraps around the hinge pin 111c through slot-shaped aperture 111j. The second hinge sleeve 114b wraps around the hinge pin 112c through slot-shaped aperture 112j. Slot-shaped aperture 111j is hidden from view in FIGS. 6 and 7. Slot-shaped aperture 112j is hidden from view in FIGS. 6 and 9.

Figure 8:
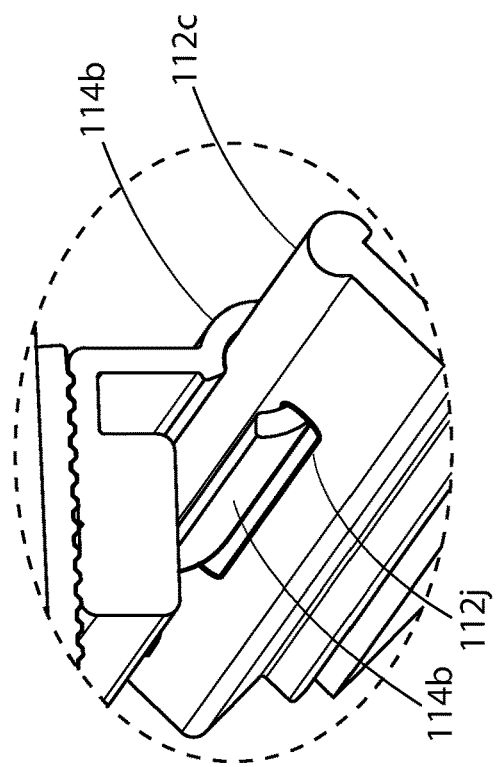
FIG. 8 illustrates a portion of FIG. 7, enlarged to magnify a portion of the hinge sleeve passing through the slot-shaped aperture as viewed from an inside face in the hinge base.
Figure 7:
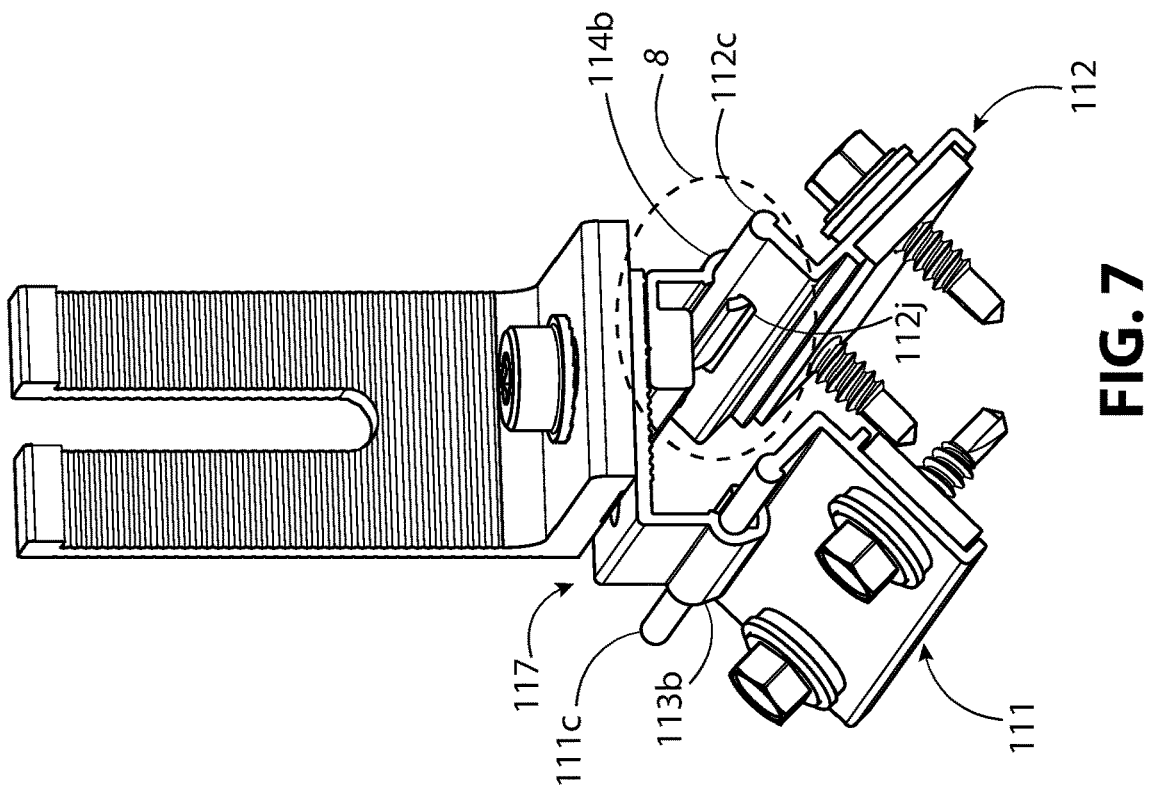
FIG. 7 illustrates a front and top isometric view of the mounting device from FIG. 2
Figure 10:
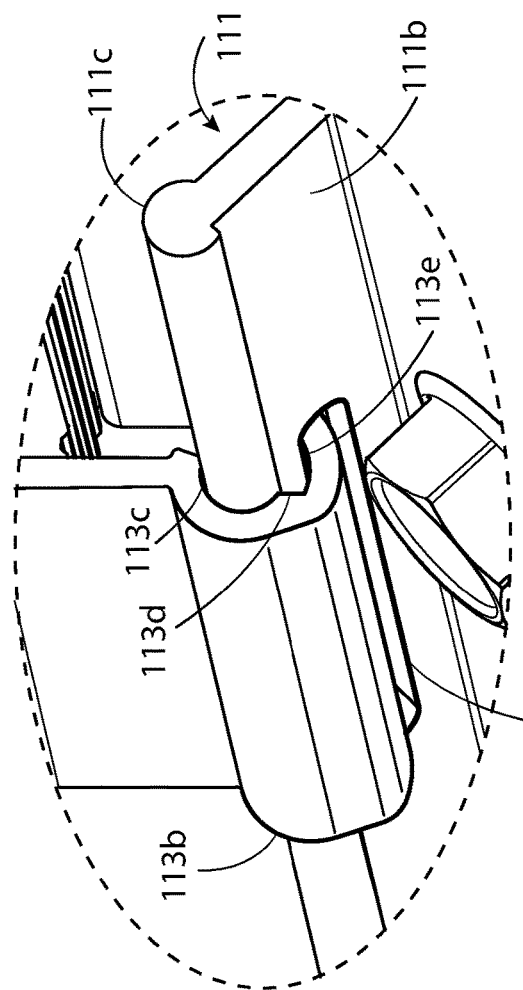
FIG. 10 illustrates a portion of FIG. 9, in isometric view, enlarged to magnify a portion of the hinge sleeve passing through the slot-shaped aperture as viewed from an outside face of the hinge base.
Figure 9:
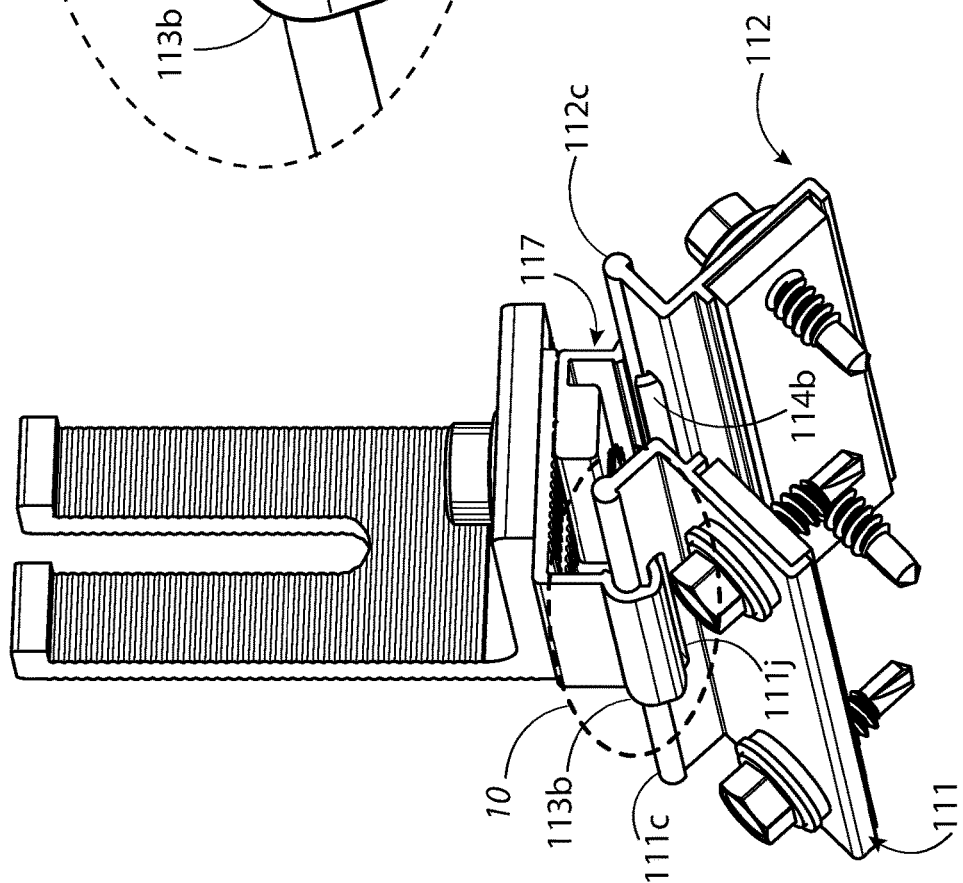
FIG. 9 illustrates a front and bottom isometric view of the mounting device of FIG. 2.

FIG. 8 illustrates a portion of FIG. 7, showing the interaction between the hinge pin 112c, the second hinge sleeve 114b, and the slot-shaped aperture 112j. FIG. 10 illustrates a portion of FIG. 9, showing the interaction between the hinge pin 111c, first hinge sleeve 113b, and the slot-shaped aperture 111j. The hinge sleeve includes a hollow interior. The inside surface of the first hinge sleeve 113b includes an upper arcuate-shaped portion 113c, a planar portion 113d (i.e. substantially flat portion), and a lower arcuate-shaped portion 113e. The upper arcuate-shaped portion 113c pivotally engages the hinge pin 111c. The planar portion 113d rotationally stops the first hinge base 111 by engaging the riser 111b.

Figure 11:
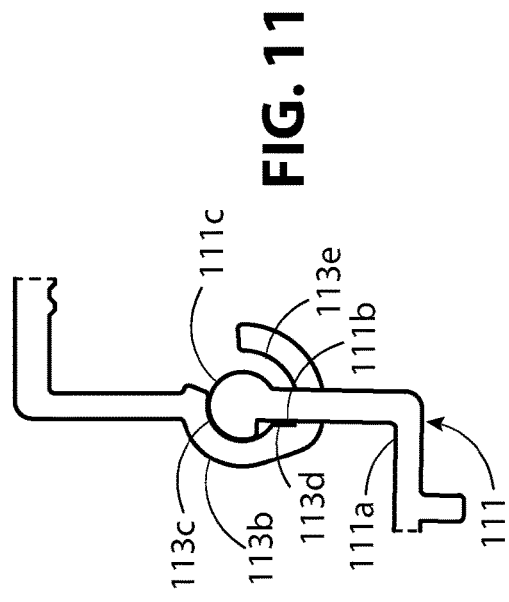
FIG. 11 illustrates a portion of FIG. 15, in front view, enlarged to magnify a portion of the hinge sleeve, hinge pin, and riser.

FIG. 11 illustrates portions of the riser 111b, hinge pin 111c, first hinge sleeve 113b, upper arcuate-shaped portion 113c, and lower arcuate-shaped portion 113e. The planar portion 113d is angled to limit the outward rotation of the roof-anchoring platform 111a by acting as a rotational stop for the planar portion 113d. As illustrated, the outward rotation of the roof-anchoring platform 111a is limited to 0 degrees (i.e. horizontal). The angle of the planar portion 113d or the angle of the riser 111b can be changed to set other outward rotation stop angles.

Figure 13:
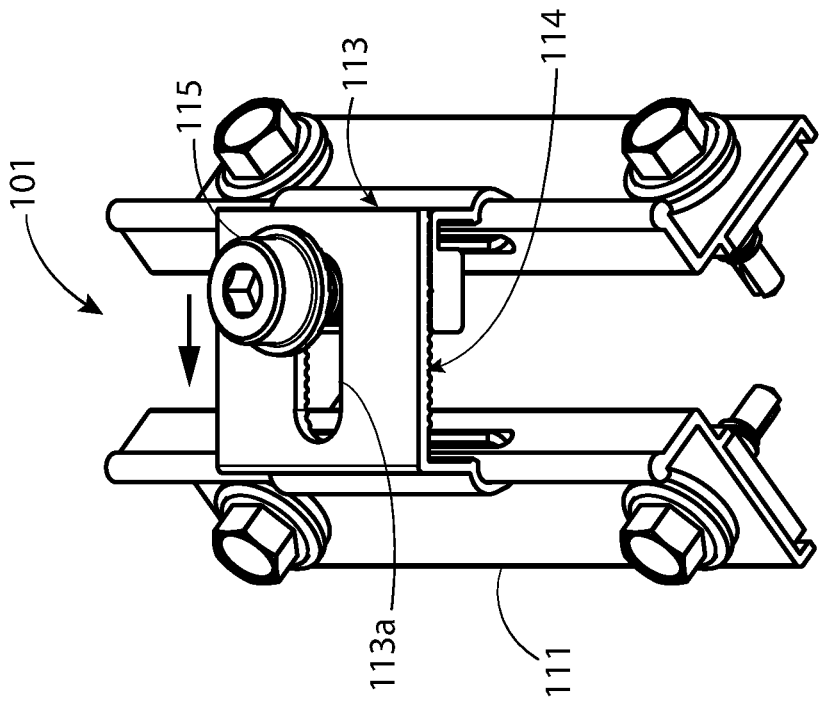
FIG. 13 illustrates the mounting device with the L-foot removed, and the hinge platform and hinge sub-platform adjusted approximately maximum position widthwise relatively to each other.
Figure 12:
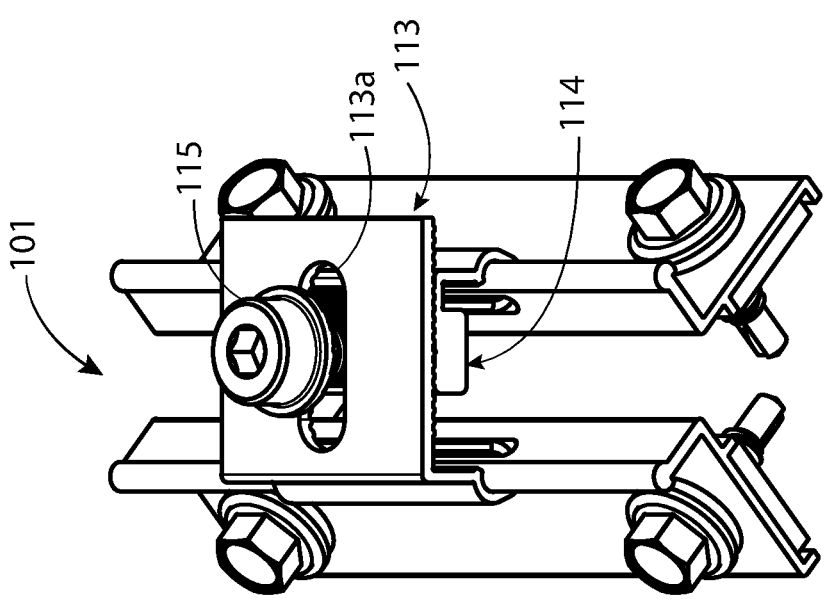
FIG. 12 illustrates the mounting device with the L-foot removed, and the hinge platform and hinge sub-platform adjusted approximately mid-position widthwise relatively to each other.

FIGS. 12 and 13 illustrate how the width of the mounting device 101 can adjusted. The L-foot is removed from the figures to help illustrate width adjustment. A portion of the threaded fastener 115 passes through the slot-shaped aperture 113a of the hinge platform 113 and threadedly engages the hinge sub-platform 114. With the threaded fastener 115, partially tightened, the hinge sub-platform 114 in combination with the threaded fastener 115 are free to move along the slot-shaped aperture 113a. In FIG. 12, the threaded fastener 115 is positioned at approximately the mid-point between either end of the slot. This places the hinge platform 113 and hinge sub-platform 114 at approximately the mid-point of the width adjustment range. In FIG. 13, the threaded fastener 115 is positioned at approximately the end of the slot distal to the first hinge base 111. This places the hinge platform 113 and hinge sub-platform 114 at maximum width.

Examples

Figure 14:
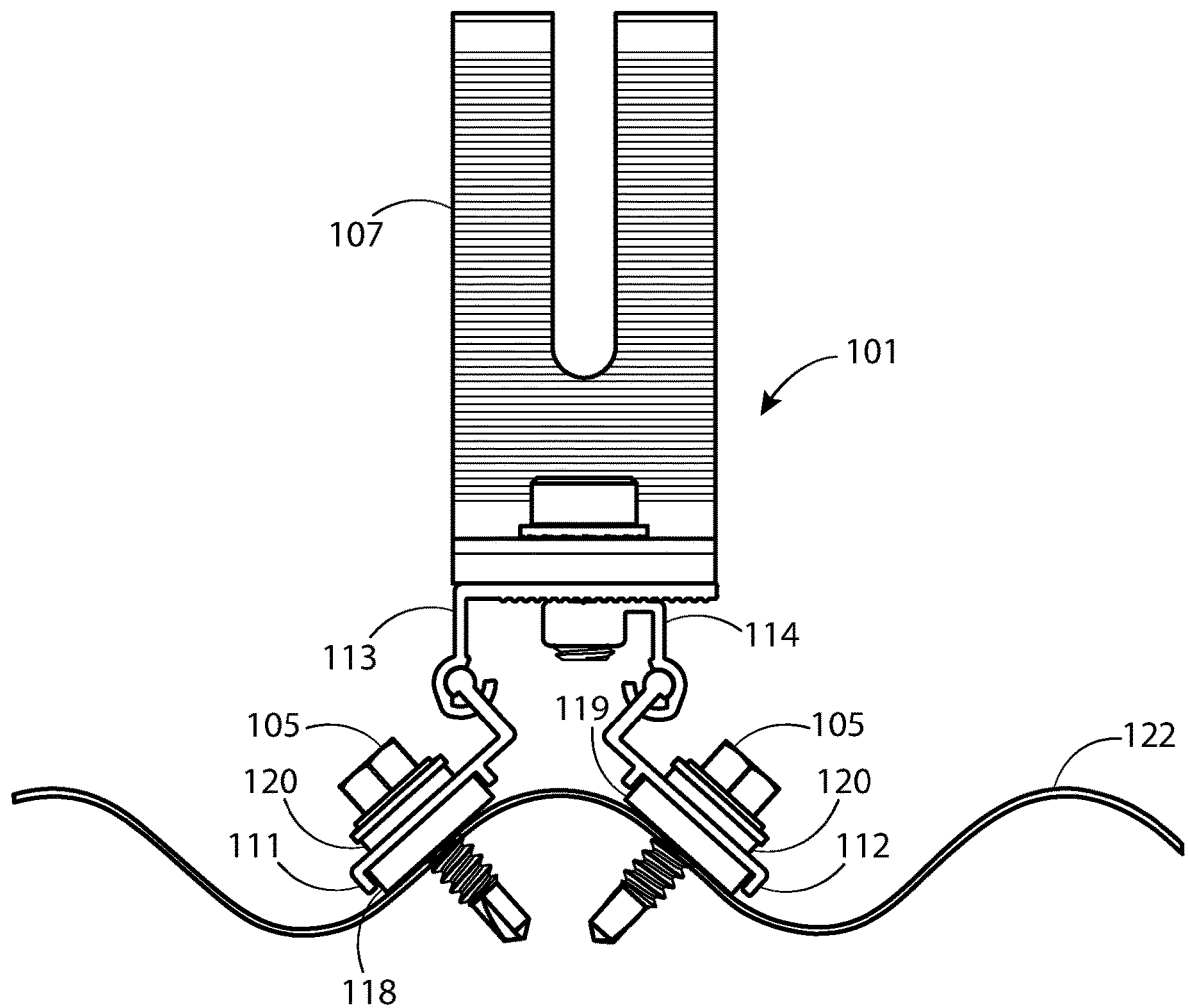
FIG. 14 illustrates, in front view, the mounting device secured to a corrugated metal roof with the front of the roof cut away.

One of the advantages of the mounting device 101 is its ability to adapt to various flat, corrugated, or ribbed metal roofs. FIGS. 14-18 illustrate a non-limiting sampling of what is possible, using mounting device 101. FIG. 14 illustrates the mounting device 101 being secured to a corrugated roof 122. In this example, the first hinge base 111 and the second hinge base 112 are angled at approximately 42-degrees with respect to the horizon. The hinge platform 113 and hinge sub-platform 114 are adjusted to approximately mid-width. For a corrugation pattern of the same height but with wider corrugations, the first hinge base 111 and the second hinge base 112 would be pivoted to a shallower angle with respect to the horizon. In addition, hinge platform 113 and hinge sub-platform 114 would be adjusted to a wider width to accommodate the wider corrugations.

The mounting device 101 is secured to the corrugated roof 122 by instances of the roof mounting fastener 105 passing into the corrugated roof 122 through first hinge base 111 and second hinge base 112. Instances of the roof mounting fastener 105 pass into sealing washer 120, first hinge base 111, and gasket 118. Instances of the roof mounting fastener 105 pass into sealing washer 120, second hinge base 112 and gasket 119.

Figure 15:
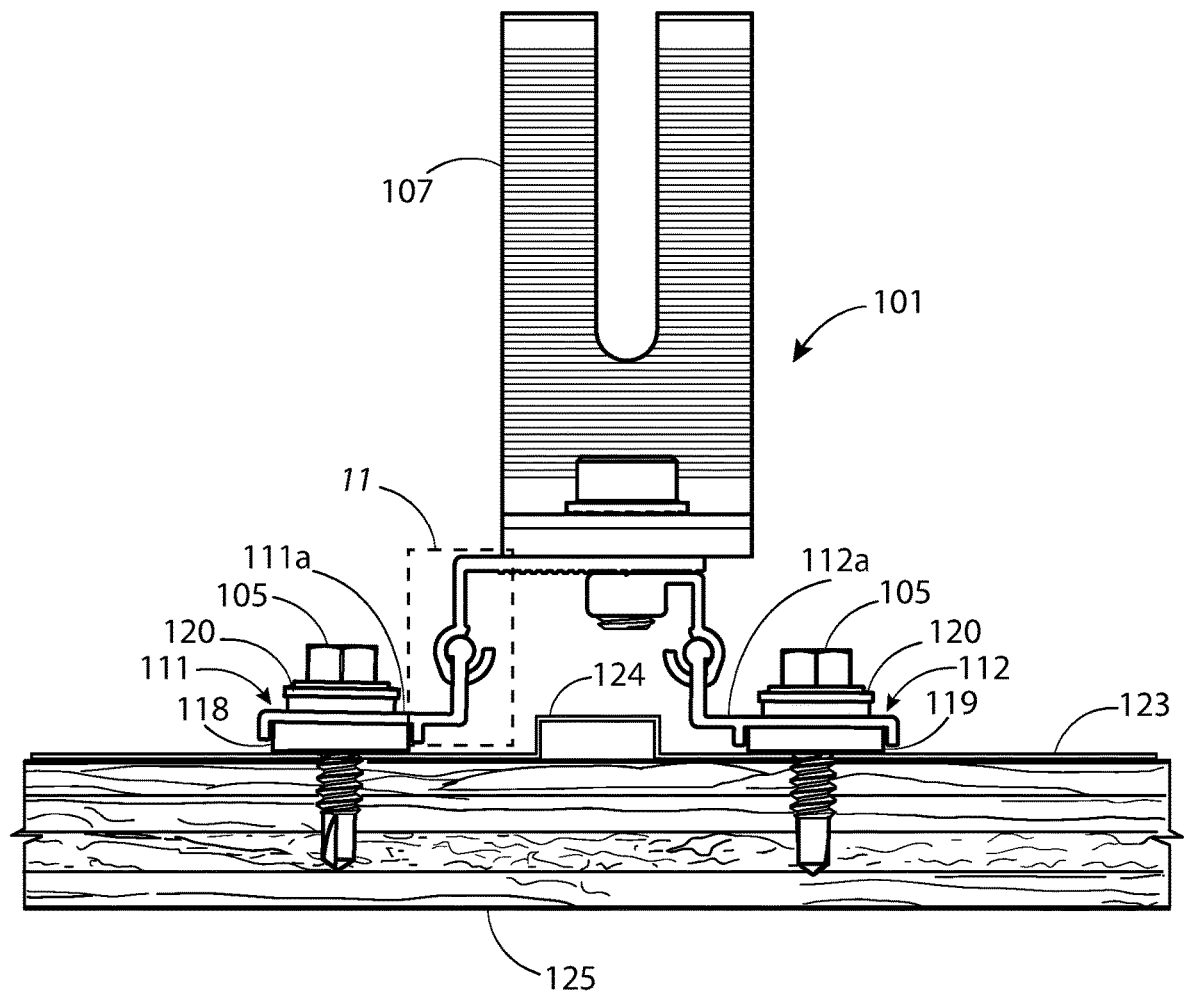
FIG. 15 illustrates in front view, the mounting device secured to a flat metal roof with the front of the roof cut away.

FIG. 15 illustrates the mounting device 101 secured to a substantially flat metal roof 123. The mounting device is shown positioned on either side of a small support rib 124. First hinge base 111 and second hinge base 112 are rotated so the roof-anchoring platform 111a and roof-anchoring platform 112a are horizontal. The mounting device 101 is secured to the substantially flat metal roof 123 by instances of roof mounting fastener 105 in combination corresponding instances of a sealing washer 120 and corresponding gaskets, gasket 118, and gasket 119. The instances of roof mounting fastener 105 can also be secured to decking or sheathing 125 for additional pullup strength. Here the sheathing 125 is shown as plywood. The mounting device 101 can also be attached to other sheathing materials, for example, plank decking, or oriented strand board (OSB).

Figure 16:
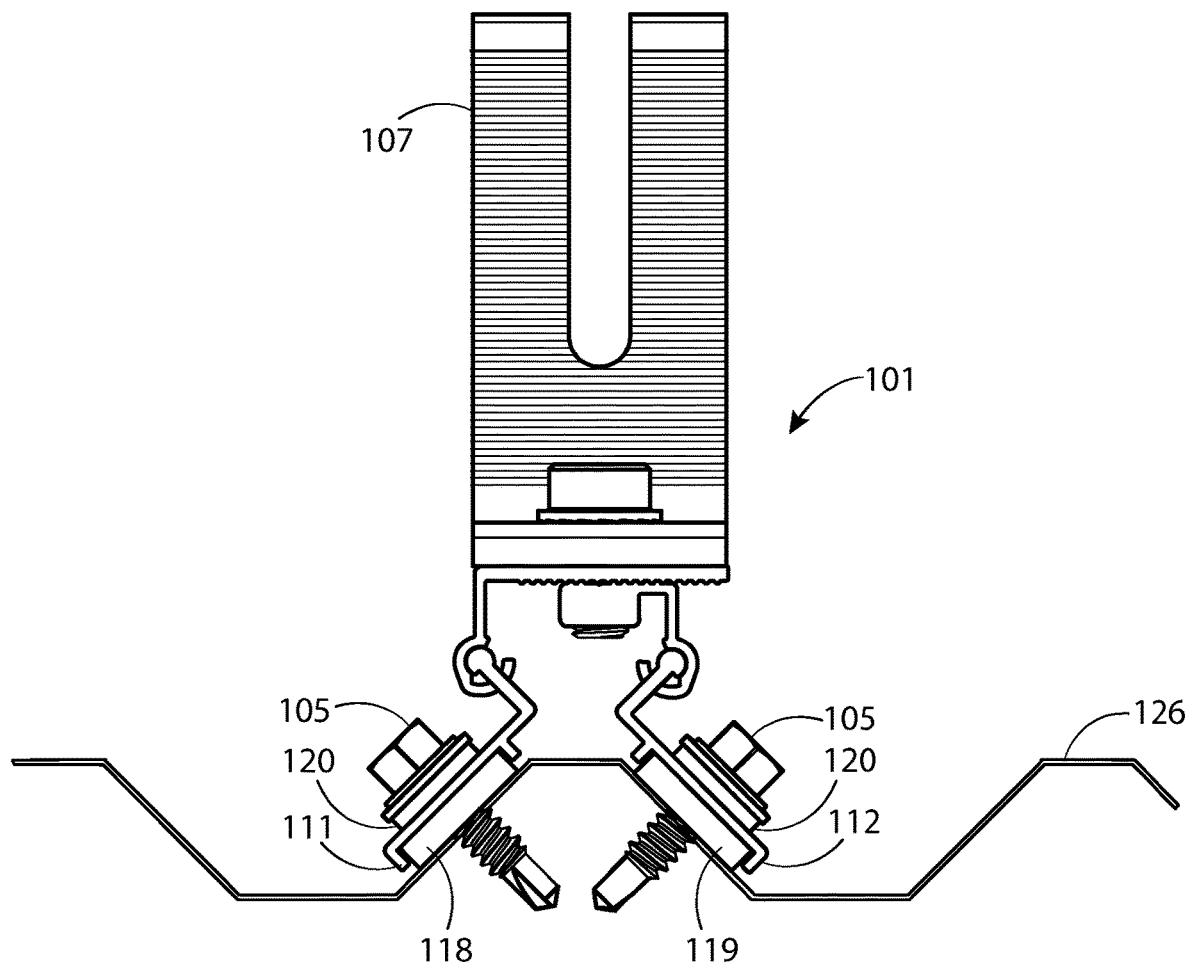
FIG. 16 illustrates, in front view, the mounting device, adjusted to approximately mid-width, and secured to a trapezoidal roof with the front of the roof cut away.
Figure 17:
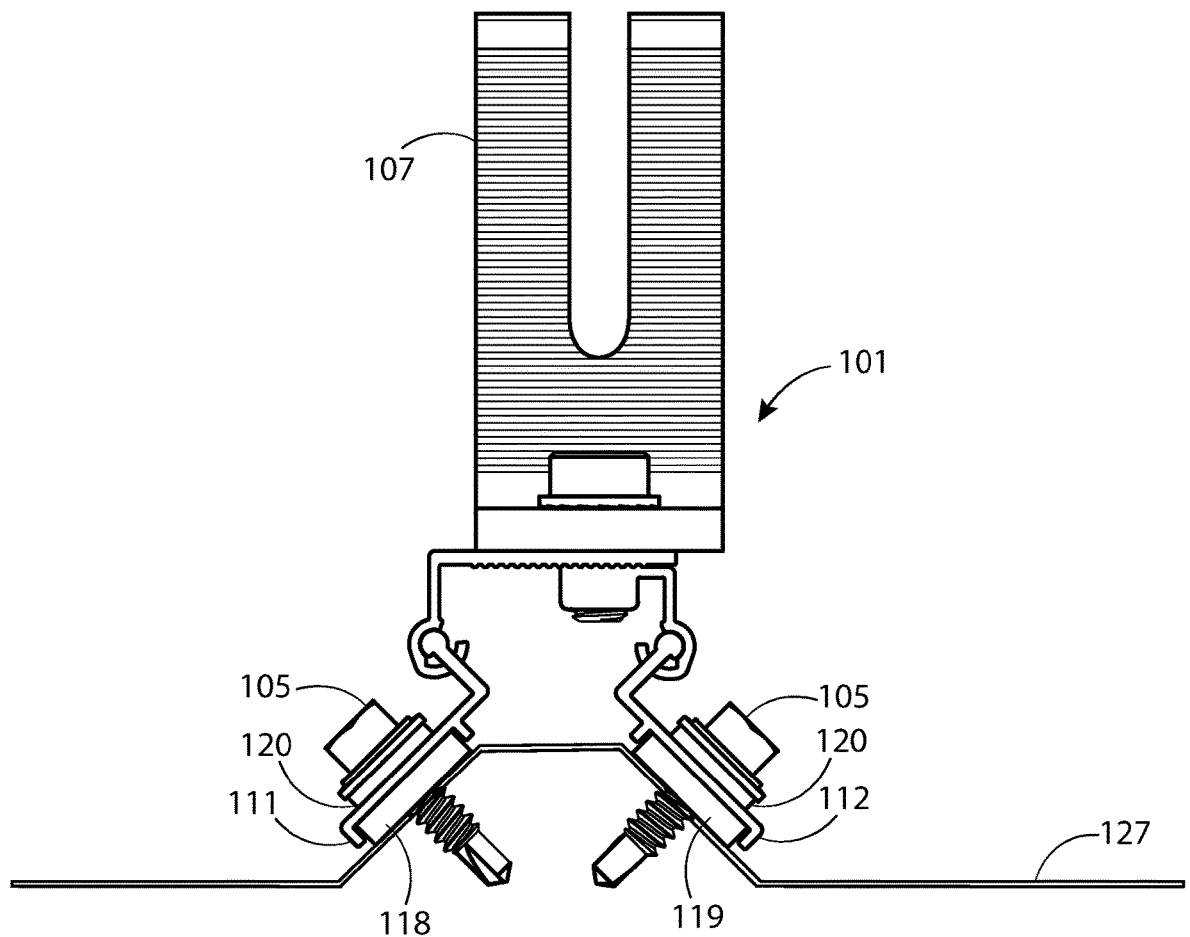
FIG. 17 illustrates, in front view, the mounting device, adjusted to approximately maximum width, and secured to a trapezoidal roof with the front of the roof cut away.
Figure 18:
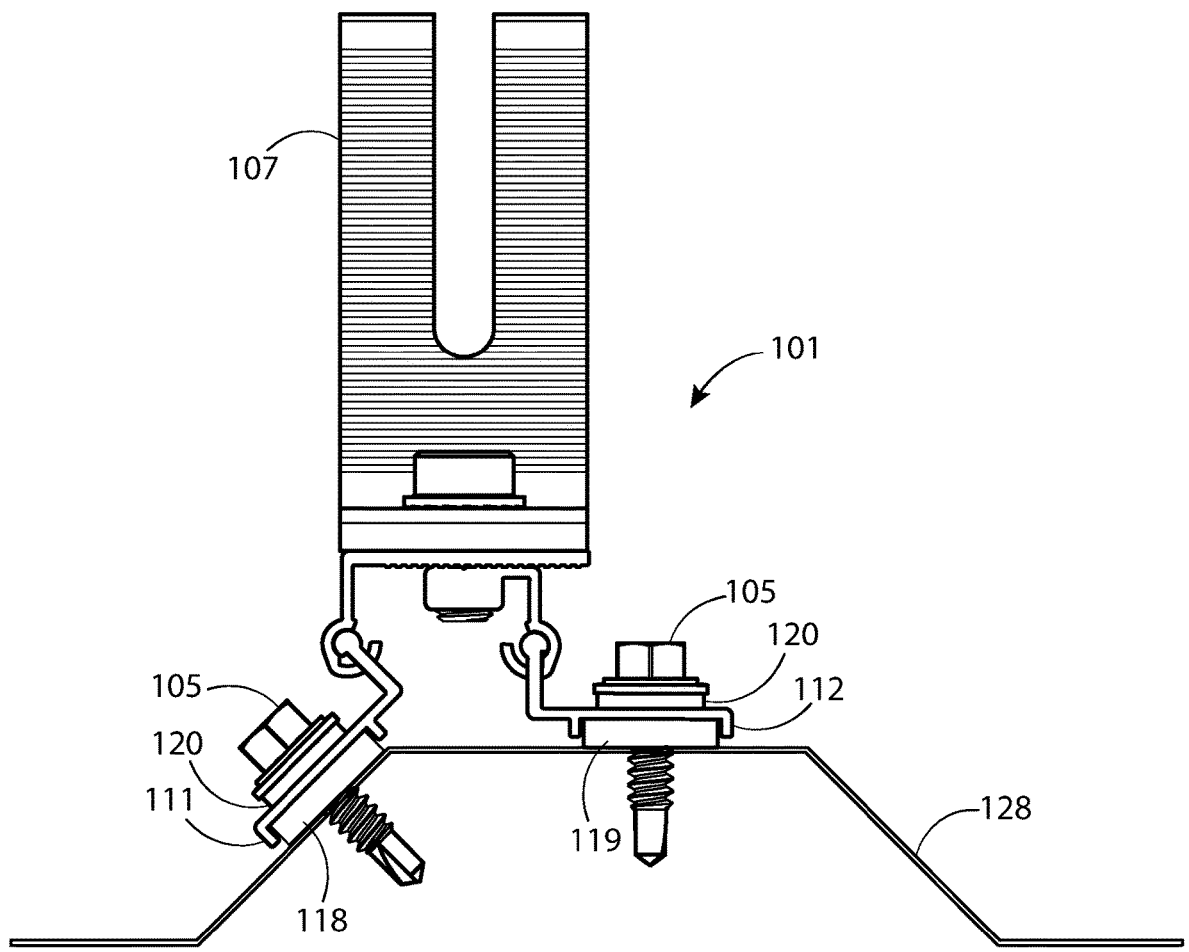
FIG. 18 illustrates in front view, the mounting device, secured to a trapezoidal roof peak that is wider and taller than those shown in FIGS. 16 and 17 and with the front of the roof cut away to show mounting details.

FIGS. 16-18 illustrate the mounting device 101 secured to trapezoidal roofs of various widths and heights. In FIG. 16, the mounting device is adjusted to mid-width and with first hinge base 111 and second hinge base 112 adjusted to approximately a 45-degree angle with respect to the horizon to accommodate trapezoidal metal roof 126. In FIG. 17, the mounting device is adjusted to maximum width and with first hinge base 111 and second hinge base 112 adjusted to approximately a 45-degree angle with respect to the horizon to accommodate trapezoidal metal roof 127. In FIG. 18, the mounting device 101 is adjusted to mid-width. First hinge base 111 is adjusted to approximately a 45-degree angle with respect to the horizon and second hinge base 112 is adjusted to approximately a 0-degrees angle with respect to the horizon to accommodate trapezoidal metal roof 128. Referring to FIGS. 16-18, in all three instances, the mounting device 101 is secured to the respective trapezoidal roof by instances of roof mounting fastener 105 in combination with corresponding instances of sealing washer 120 and corresponding gaskets, gasket 118 and gasket 119.

While an L-foot 107 is shown in FIGS. 14-18, any solar racking bracket can be used in place of the L-foot 107. For example, the L-foot adapter 108 of FIG. 4 could be mounted directly to the mounting device 101 of FIGS. 14-18 if height adjustment is not required.

CONCLUSION

Described are devices and systems for mounting solar panels to various types of metal roofs. The description is not exhaustive and not exclusive. Examples of components and configurations are meant to aid the reader in understanding the described general principles. The following are examples of how different components, structures, and features can be varied while still adhering to the general principles.

Referring to FIGS. 5 and 6, the slot-shaped opening 107d can streamline assembly by providing an open end for fasteners pre-attached to racking assemblies to slide into. There are instances where a slot-shaped opening is not required or desirable and the L-foot 107 is not limited to having a slot-shaped opening. For example, it could have a round aperture or a closed slotted aperture.

Referring to FIG. 5, threaded fastener 115 is illustrated as a socket head screw (or socket head bolt) with an internal hexagonal ("hex") socket. The threaded fastener 115 is not limited to this. It can be any threaded fastener suitable for rigidly holding together the hinge platform 113 to the hinge sub-platform 114 and optionally holding an L-foot 107 or an L-foot adapter to the hinge platform assembly 117. For example, the threaded fastener can have a socket head screw with a torx, Robertson (i.e., square), or tamper-resistant sockets. The threaded fastener can be a hex head bolt or could be a button-head cap screw with any suitable socket or head type. It can be a screw with various types of heads, for example: Philips head, combination head, slotted head, or torx head. While threaded fastener 115 is shown as flanged, it can alternatively be unflanged. Threaded fastener 115 can be paired with various washers. For example, a toothed washer, a spring washer, or a lock washer.

Roof mounting fastener 105 discussed in FIGS. 2, 3, 5, 6, and 14-18 is illustrated as a self-drilling roofing screw with a hex head. The sealing washer 120 is called out as a separate component. Roof mounting fastener 105 and the sealing washer 120 are often sold as one unit. For example, a hex head self-drilling roof screw with a built-in sealing washer with a neoprene seal is sold by ITW Brands under the registered trademark TEKS®. While self-drilling or self-tapping screws are convenient, non-self-tapping or non-self-drilling screws can be used with a predrilled pilot hole. While roof mounting fasteners typically have hex heads, it may be desirable to use other fastener heads, for example, socket heads with a hex socket or a torx socket. Any threaded fastener capable of securing the mounting device 101 can be used that meets local and regional regulatory requirements and can withstand the day-to-day solar array environmental installation conditions.

Referring to FIG. 5, the first hinge base 111 is illustrated with roof-anchoring platform 111a, riser 111b, hinge pin 111c, and slot-shaped aperture 111j, with the slot-shaped aperture 111j extending through riser 111b. Likewise, FIG. 5 illustrates roof-anchoring platform 112a, riser 112b, hinge pin 112c, and slot-shaped aperture 112j, with slot-shaped aperture 112j extending through riser 112b. It is possible to eliminate riser 111b and have the hinge pin 111c extend directly and rigidly upward from roof-anchoring platform 111a and with the slot-shaped aperture 111j extending lengthwise through roof-anchoring platform 111a. Similarly, hinge pin 112c could extend directly and rigidly upward from roof-anchoring platform 112a with the slot-shaped aperture 112j extending lengthwise through roof-anchoring platform 112a. First hinge sleeve 113b would surround hinge pin 111c and extend into slot-shaped aperture 111j, as previously described. Second hinge sleeve 114b would surround hinge pin 112c and extend into slot-shaped aperture 112j, also as previously described. First sidewall 111f, second sidewall 111g, first sidewall 112f, and second sidewall 112g could be lengthened to allow the curvature of the first hinge sleeve 113b and second hinge sleeve 114b to clear the metal roof surface.

The hinge platform 113 and hinge sub-platform 114 are not limited to the shapes and proportions illustrated. For example, the hinge platform top 113f and slot-shaped aperture 113a can be extended to allow the mounting device 101 to accommodate a greater range of metal roof profiles. The hinge platform riser 113g can be extended or shortened in proportion to the hinge platform top 113f to create greater or less vertical clearance. The angle between the hinge platform top 113f and hinge platform riser 113g is illustrated as approximately a 90-degree angle. The angle between the hinge platform top 113f and hinge platform riser 113g is not limited to a 90-degree angle. For example, the hinge platform riser 113g could be extended and the angle between the hinge platform top 113f and hinge platform riser 113g could be changed to an obtuse angle to accommodate a greater range of trapezoidal roof profiles. Similar modifications to width, height, or angle, as given in the various examples above would typically be applied to the hinge platform top 114f and hinge platform riser 114g to maintain symmetry.

Continuing to refer to FIG. 5, the hinge platform assembly 117 is shown as two sub-assemblies, hinge platform 113 and hinge sub-platform 114 to allow the hinge platform assembly to be adjusted widthwise. If widthwise adjustment is not required, the hinge platform assembly 117 could be constructed as a one-piece unit. The first hinge sleeve 113b and the second hinge sleeve 114b are typically aligned at the same distance from the hinge platform top 113f so that they are parallel to each other. While in most applications this is desirable, there may be applications where the first hinge sleeve 113b and the second hinge sleeve 114b could be offset. In that case, first hinge sleeve 113b and the second hinge sleeve 114b would not be aligned at the same distance from the hinge platform top 113f.

Referring to FIG. 11, the angle of planar portion 113d could be changed to allow either a greater or lesser range of movement of the first hinge base 111. For example, in FIG. 15, the first hinge base 111 can swing from an acute angle to approximately 0-degrees (i.e., flat) with respect to the plane of roof. Referring to FIG. 11, the maximum extent is limited to a 0-degree angle with respect to the plane of the roof because of the angle of the planar portion 113d. The angle of the planar portion 113d could be changed to allow the first hinge base 111 to pivot outward to an obtuse angle.

FIGS. 14-18 show various metal roof profiles. In FIGS. 14, and 16-18, roof decking is omitted to simply the figures. Typically, roof decking, such as the sheathing 125 in FIG. 15, would typically be used in combination with joists or roof framing. Alternately, roof joists or framing could be used without roof decking. In general, it should be possible to use the mounting device 101 for various metal roof profiles regardless of the underlying roof support structure. Note that throughout this disclosure, the terms "roof decking" and "roof sheathing" are synonymous.

In FIGS. 1 and 2 the L-foot 107 is shown without surface ribbing. In FIG. 2, the L-foot adapter 108 is also shown without surface ribbing. The ribbing shown for the L-foot adapter 108 in FIG. 4 and for the L-foot 107 in FIGS. 5, 6, 7, 9, and 14-18 is optional. The purpose of the surface ribbing is to provide better grip strength between the components. If these components are made of an electrically conductive material, such as aluminum, steel, or electrically conductive plastic (i.e., plastic mixed with electrically conductive material), then the surface ribbing can help to provide an electrically conductive pathway between the components.

One of the advantages of the mounting device 101 as presented in the figures is that the components can be extruded, which can potentially reduce manufacturing costs. Referring to FIG. 5, the first hinge base 111, second hinge base 112, hinge platform 113, hinge sub-platform 114, L-foot 107, as well as the L-foot adapter 108 of FIG. 4 can be made of a metallic material, such as aluminum or steel. These can potentially be extruded, cast, stamped, or otherwise formed. In addition, it is possible to extrude, mold, or 3D print the above-mentioned components out of a plastic or an electrically conductive plastic.

The variations described, the general principles taught, as well as undescribed variations, devices, and systems that encompass at least some of the general principles described in this disclosure, are within the scope of the claims.

The invention claimed is:

1. A device for attaching a solar panel to a metal roof, comprising:
a hinge base including a roof-anchoring platform, a hinge pin extending lengthwise along the roof-anchoring platform, and a slot-shaped aperture extending lengthwise along the hinge base;
a hinge platform assembly including a hinge sleeve extending downward from the hinge platform assembly; and
the hinge sleeve includes an upper arcuate-shaped portion received by the slot-shaped aperture with the hinge pin being pivotable about the upper arcuate-shaped portion.

2. The device of claim 1, wherein the hinge pin extends upward and lengthwise along the roof-anchoring platform.

3. The device of claim 1, further comprising:
a riser extending upward from the roof-anchoring platform, the hinge pin extends lengthwise along an end of the riser, and the slot-shaped aperture extending lengthwise through the riser.

4. The device of claim 1, wherein:
the hinge platform assembly includes a hinge platform with a second slot-shaped aperture extending through the hinge platform, a hinge sub-platform positioned below the hinge platform, and a threaded fastener extending into the second slot-shaped aperture and threadedly engaging the hinge sub-platform.

5. The device of claim 4, wherein the upper arcuate-shaped portion extends downward from the hinge platform.

6. The device of claim 4, wherein the upper arcuate-shaped portion extends downward from the hinge sub-platform.

7. The device of claim 1, further comprising:
the hinge platform assembly includes a hinge platform top; and
a solar racking bracket secured to the hinge platform top.

8. The device of claim 7, wherein the solar racking bracket is an L-foot.

9. A system for attaching a solar panel to a metal roof, comprising:
a hinge base including a roof-anchoring platform, a hinge pin extending upward and lengthwise along the roof-anchoring platform, and a slot-shaped aperture extending lengthwise along the hinge base;
a hinge platform assembly including a hinge sleeve extending downward from the hinge platform assembly;
the hinge sleeve includes an upper arcuate-shaped portion received by the slot-shaped aperture with the hinge pin being pivotable about the upper arcuate-shaped portion;
a solar racking bracket secured to the hinge platform assembly;
a rail secured to the solar racking bracket; and
the solar panel, the solar panel secured to the rail.

10. The system of claim 9, further comprising:
a riser extending upward from the roof-anchoring platform, the hinge pin extends lengthwise along an end of the riser, and the slot-shaped aperture extending lengthwise through the riser.

11. The system of claim 9, wherein:
the hinge sleeve further includes a planar portion positioned below the upper arcuate-shaped portion, and a lower arcuate-shaped portion positioned below the planar portion; and
the lower arcuate-shaped portion passes into the slot-shaped aperture and the planar portion limits outward rotation of the roof-anchoring platform.

12. The system of claim 9, wherein:
the hinge platform assembly includes a hinge platform with a second slot-shaped aperture extending through the hinge platform, a hinge sub-platform positioned below the hinge platform, and a threaded fastener extending into the second slot-shaped aperture and threadedly engaging the hinge sub-platform.

13. The system of claim 12, wherein:
the upper arcuate-shaped portion extends downward from the hinge platform.

14. The system of claim 12, wherein:
the upper arcuate-shaped portion extends downward from the hinge sub-platform.

15. The system of claim 9, further comprising:
the hinge platform assembly includes a hinge platform top; and
the solar racking bracket is secured to the hinge platform top.

16. The system of claim 15, wherein the solar racking bracket is an L-foot.

17. A device for attaching a solar panel to a metal roof, comprising:
a first hinge base including a first roof-anchoring platform, a first hinge pin extending lengthwise along the first roof-anchoring platform, and a first slot-shaped aperture extending lengthwise along the first hinge base;

a second hinge base including a second roof-anchoring platform, a second hinge pin extending lengthwise along the second roof-anchoring platform, and a second slot-shaped aperture extending lengthwise along the second hinge base;

a hinge platform assembly including a first hinge sleeve and a second hinge sleeve each extending downward from the hinge platform assembly;

the first hinge sleeve includes a first upper arcuate-shaped portion received by the first slot-shaped aperture with the first hinge pin being pivotable about the first upper arcuate-shaped portion; and the second hinge sleeve includes a second upper arcuate-shaped portion received by the second slot-shaped aperture with the second hinge pin being pivotable about the second upper arcuate-shaped portion.

18. The device of claim 17, wherein:

the hinge platform assembly includes a hinge platform and hinge sub-platform being widthwise adjustable with respect to the hinge platform; and the first upper arcuate-shaped portion extends downward from the hinge platform and the second upper arcuate-shaped portion extends down from the hinge sub-platform.

19. The device of claim 17, wherein:

the hinge platform assembly includes a hinge platform with a third slot-shaped aperture extending through the hinge platform, a hinge sub-platform positioned below the hinge platform, and a threaded fastener extending into the third slot-shaped aperture and threadedly engaging the hinge sub-platform; and the first upper arcuate-shaped portion extends downward from the hinge platform and the second upper arcuate-shaped portion extends down from the hinge sub-platform.

20. The device of claim 17, wherein:

the hinge platform assembly includes a hinge platform and hinge sub-platform being widthwise adjustable with respect to the hinge platform; and the first upper arcuate-shaped portion extends downward from the hinge platform and the second upper arcuate-shaped portion extends down from the hinge sub-platform.

* * * * *